Feb. 18, 1964 S. V. MIANO ETAL 3,121,339
ADJUSTABLE COMPENSATOR MECHANISM FOR NONLINEAR ROTARY MOTION
Filed April 24, 1961

INVENTORS
SALVATORE V. MIANO
FRANK M. AFRICANO
BY *Herbert L. Davis*
ATTORNEY

United States Patent Office 3,121,339
Patented Feb. 18, 1964

3,121,339
ADJUSTABLE COMPENSATOR MECHANISM FOR NONLINEAR ROTARY MOTION
Salvatore V. Miano, Brooklyn, N.Y., and Frank M. Africano, Maywood, N.J., assignors to The Bendix Corporation, Teterboro, N.J., a corporation of Delaware
Filed Apr. 24, 1961, Ser. No. 104,935
8 Claims. (Cl. 74—393)

The present invention relates to an adjustable compensator mechanism for nonlinear rotary motion and more particularly to an adjustable gear train to convert constant angular input velocity to accelerated and retarded output motion.

The invention further relates to an adjustable gear train to convert constant angular velocity to accelerated and retarded motion, such as sinusoidal type of nonlinearity, and to produce the reverse effect. It is particularly directed to a novel means of selecting, by means of an externally accessible setting screw, a particular degree of nonlinearity. In the aforenoted means, there are provided a pair of eccentric bushings on which are rotatably mounted eccentric gears adjustably positioned axially thereon. The eccentric gears are axially positioned on the bushings in one direction by adjustable screw threaded bearing members while biased in the opposite direction by suitable springs. The eccentric gears are further so arranged as to continue in driving relation at different adjusted positions on the eccentric bushings by the provision of one of the eccentric gears in the form of a split gear including a spring so arranged as to bias the teeth of the split gear into engaging relation with the teeth of the other eccentric gear. Thus, the eccentric gears remain in driving relation although adjustably positioned axially along the respective eccentric bushings to vary the eccentricity of the gearing.

An object of the invention is to provide a gearing device including novel means of selecting, by means of an externally accessible setting screw, a particular degree of nonlinearity of output motion and to provide a device adapted for encasement as a self-contained unit which may be introduced as a component in a gear train the linearity of which is to be controlled.

Further in the development of aircraft instruments there is often a need to compensate for nonlinearity in the operating gearing thereof to effect for example an altitude indication in response to prevailing barometric pressure conditions. Moreover, in such instruments the operating gearing is often intended to operate in response to linear displacements while this condition seldom obtains because of an accumulation of manufacturing tolerances causing a certain amount of inherent eccentricity to exist in the operating gearing while an object of the present invention is to provide novel adjustable means to compensate for most, if not all, of the error in such gearing.

Another object of the invention is to provide in the aforenoted novel selective compensating means a pair of eccentric bushings on which are rotatably mounted eccentric gears adjustably positioned axially thereon to vary the eccentricity thereof.

Another object of the invention is to provide novel means cooperating with the aforesaid eccentric gears so that the eccentric gears may be axially positioned on the eccentric bushings in one direction by adjustable screw threaded bearing members while biased in the opposite direction by suitable spring means and in which the eccentric gears are further so arranged as to continue in driving relation at different adjusted positions on the eccentric bushings by the provision of one of the eccentric gears in the form of a pair of split gear members including a spring so arranged as to bias the teeth of the pair of gear members into variable engaging relation with the teeth of the other eccentric gear in such a manner that the eccentric gears remain in driving relation although adjustably positioned axially along the respective eccentric bushings to vary the eccentricity of the gearing and thereby the ratio between the input and the output motion imparted through the gear train.

Another object of the invention is to provide a novel arrangement of eccentric bushings and axially adjustable eccentric input and output gears at least one of which gears is in the form of a pair of split gear members having torsion spring means biasing the split gear members in opposing clockwise and counterclockwise directions relative one to the other so that the teeth of the respective split gear members are so biased as to engage therebetween in smooth operative relation with the teeth of the other eccentric gear to maintain the eccentric input and output gears in driving relation over an operative range of adjustment thereof axially along the respective eccentric bushings to effect a selected variance in the driving relation between the input and output gears.

Another object of the invention is to provide novel means for selectively adjusting the eccentricity of the foregoing gearing together with the provision of novel means for operating such eccentricity selecting means in accordance with a predetermined program to provide predetermined unique rotary motions at a controlled output shaft.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Figure 1:
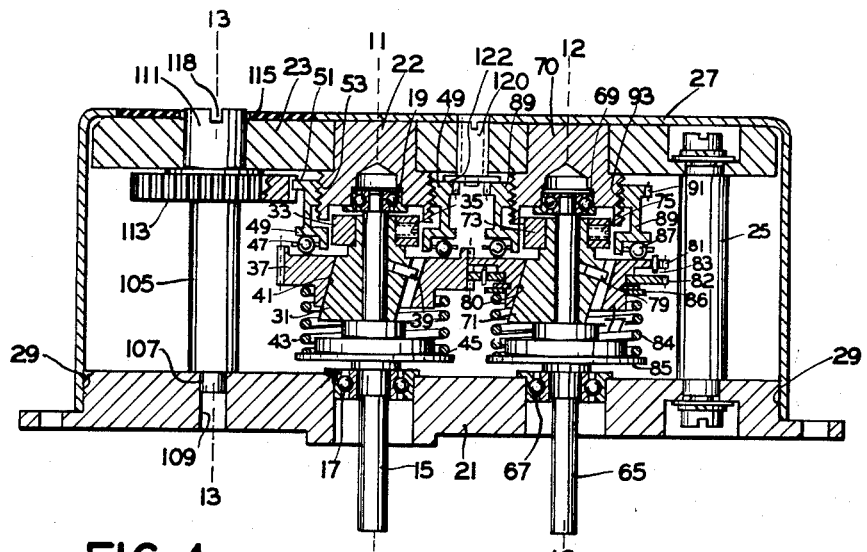
FIGURE 1 is an enlarged sectional view of the adjustable compensator mechanism with the ratio selecting means shown in a revolved position relative to the adjustable screw threaded bearing members of the eccentric bushings for purposes of clarity.
Figure 3:
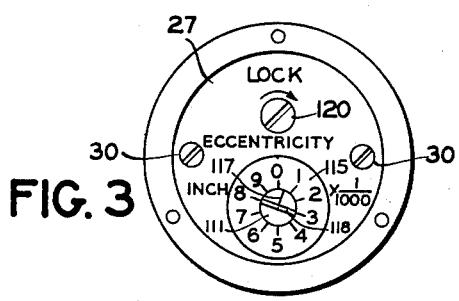
FIGURE 3 is a reduced top plan view of the adjustable compensator mechanism.
Figure 4:
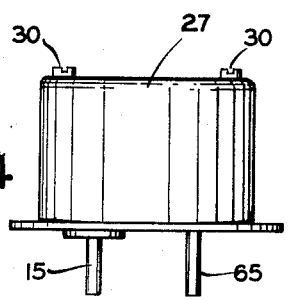
FIGURE 4 is a side view of FIGURE 3.

Referring to the drawing of FIGURE 1, there are shown three principal axes of rotation labeled 11, 12 and 13. On the axis 11 is an input shaft 15 which is supported by ball bearings 17 and 19 carried respectively by a base plate 21 and a threaded stud 22 mounted in a supporting plate 23. The supporting plate 23 is spaced from the base plate 21 by posts 25. A cover 27 houses the unit and fits tightly about a flange portion 29 of the base plate 21. Screws 30 fasten the cover 27 to the supporting plate 23, as shown in FIGURE 3.

On the input shaft 15 is an eccentric bushing 31 which is clamped to the shaft 15 by a clamping collar 33 having a set screw 35. An input gear 37 is slidably secured by a key 39 to the eccentric bushing 31 so that it can slide on its axially variable or inclined cam surface 41. A spring 43 supported at one end by a flange 45 carried by the shaft 15 bears at the opposite end upon the input gear 37 so as to bias the gear 37 against thrust bearings 47 which are in turn supported by an adjustment gear 49 which has external gear teeth 51 and internal screw threads 53. The screw threaded stud 22 is pressed in upper plate 23, and its screw threads engage the internal threads 53 of adjustment gear 49 to effect an axial adjustment of the gear 49 relative to the stud 22 in response to an angular adjustment of the gear 49.

On axis 12 there is located on output shaft 65 which is supported by ball bearings 67 and 69 carried respectively by the base plate 21 and a threaded stud 70 mounted in the supporting plate 23. Further there is provided on the output shaft 65 an eccentric bushing 71 which is clamped to the shaft 65 by a clamping collar 73 having a set screw 75. An output gear 77 is slidably secured by a key 79 to the eccentric bushing 71 so that the output gear 77 may slide on the axially variable or inclined cam surface 80 of the eccentric bushing 71.

The output gear 77 includes a pair of split gear members 81 and 82 angularly movable relative one to the other under the biasing force of a torsion spring 83 tending to bias the teeth of the pair of gear members 81 and 82 so as to variably engage in operative relation therebetween with the teeth of the other eccentric gear 37 in such a manner that the eccentric gears 37 and 77 remain in driving relation although adjustably positioned axially along the respective inclined surfaces 41 and 80 of the bushings 31 and 71 to vary the eccentricity of the gears 37 and 77 and thereby the ratio between the motion imparted to the input shaft 15 and that imparted to the output shaft 65 through the gears 37 and 77. The gear 77 in the arrangement of the split gear member 81 and 82 together with torsion spring 83 may be of a type of backlash or nonchattering gear such as described in the expired U.S. Patent No. 1,619,799, granted March 1, 1927, to Charles W. Rounds et al.

A spring 84 supported at one end by a flange 85 carried by the shaft 65 bears at the opposite end thereof upon a thrust washer 86 carried by the output gear 77. The arrangement is such that the spring 84 biases the gear 77 against thrust bearings 87 which are in turn supported by an adjustment gear 89 which has external teeth 91 and internal screw threads 93. The threaded stud 70 is pressed in upper plate 23 and its screw threads engage the internal threads 93 of adjustment gear 89 to effect an axial adjustment of the gear 89 relative to the stud 70 in response to an angular adjustment of the gear 89.

Figure 2:
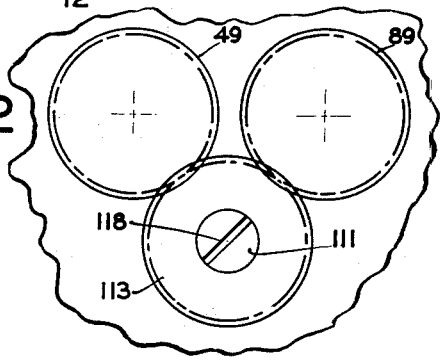
FIGURE 2 is a fragmentary top view of the mechanism of FIGURE 1 showing the operative relation between the ratio selecting means and the adjustable screw threaded bearing members.

On axis 13 is located an adjustable shaft 105 having an end portion 107 rotatably supported in an opening 109 provided in the base plate 21. At an opposite end of the shaft 105 is a head portion 111 angularly adjustable in the supporting plate 23. Affixed to the shaft 105 is a pinion 113 which has teeth engaging teeth 51 and 91 of the respective adjustment gears 49 and 89, as shown in FIG. 2. Mounted on the supporting plate 23 is a calibrated dial 115 having numbers thereon cooperating with an indicator or lubber line 117 on the head portion 111 to indicate a selected eccentricity. The head portion 111 has a cleft 118 formed therein for receiving a screw driver so that adjustment of the shaft 105 may be readily effected to cause the selected eccentricity of the gearing. There is further provided means for locking the eccentricity adjustment gears 49 and 89 in a selected position. The locking means includes a cleft headed bolt 120 screw threadedly engaged in the supporting plate 23 and having a locking plate 122 affixed to the inner end thereof for releasably engaging the gears 49 and 89.

After the unit has been mounted as a component of a gear train, a desired eccentricity is selected by first unlocking the adjustment gears 49 and 89 by withdrawing the locking plate 122 and then inserting a screw driver into the cleft 118 of the head portion 111 of shaft 105, which is exposed at the top of the device, and angularly adjusting the shaft 105 by manual operation of the screw driver until the lubber line 117 on the head portion 111 coincides with the selected number on dial 115. This action causes pinion 113 to effect an angular adjustment of the gears 49 and 89 in the same direction. As gears 49 and 89 turn they simultaneously reset their axial position by riding on the screw threads of stationary studs 22 and 70, respectively, and which screw threads are so arranged as to effect an axial adjustment of the gears 49 and 89 in a like sense. This axial movement of the adjustment gears 49 and 89 is transmitted through thrust bearings 47 and 87 so as to in turn cause input gear 37 and output gear 77 to be axially adjusted in a like sense and assume new positions along the inclined cam surfaces 41 and 80 of the eccentric bushings 31 and 71.

Furthermore in the aforenoted arrangement, the springs 43 and 84 serve to exert reaction forces against gears 37 and 77 while the gears 37 and 77 are prevented from turning relative to shafts 15 and 65 by means of keys 39 and 79 in the eccentric bushings 31 and 71 and collar clamps 33 and 73.

When a constant angular velocity is applied to input shaft 15 gear 37 turns eccentrically as prescribed by eccentric bushing 31, while thrust bearing 47 rolls between rotating gear 37 and fixed adjustment gear 49. Since split gears 81 and 82 on output shaft 65 are in mesh with input gear 37 they too will rotate eccentrically. Moreover, whereas input shaft 15 rotates at constant velocity, output shaft 65 will first retard and then accelerate during each revolution due to the eccentricity of the gearing 37 and 77 thus producing nonlinearity of motion at the output shaft 65.

Modified Form of the Invention

In the aforenoted mechanism of FIGURE 1, an additional effect may be produced by providing means for causing the selection pinion 113 to oscillate according to a prescribed program introduced externally by operation of suitable means for effecting adjustment of the shaft 105.

Figure 5:
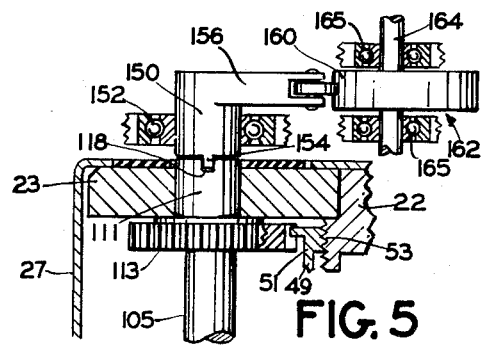
FIGURE 5 is a fragmentary sectional view of a modified form of operating mechanism for the ratio selecting means of FIGURE 1 in which like numerals indicate corresponding parts.

As shown in the modified form of the invention illustrated in FIGURE 5, the foregoing prescribed program of operation may be effected by a shaft 150 mounted in bearings 152 and having a key 154 at one end thereof operatively engaged in the cleft 118 of the head portion 111 for effecting the operative adjustment of the shaft 105. An arm 156 may be affixed at the opposite end of the shaft 150 so as to be biased by a suitable spring, not shown, into contacting relation with surface 160 of predetermined contour on cam 162. The cam 162 may be rotated by a shaft 164 mounted in bearings 165 and driven by a motor or manually operated, as the case may be, so as to cause the arm 156 to follow the cam surface 160 and the selection pinion 113 to oscillate in accordance with a prescribed program provided by the contour of the surface 160 of the cam 162.

The combination of the oscillatory motion of selection pinion 113 and nonlinear motion imposed upon split gears 81 and 82 can produce a variety of predetermined unique nonlinear rotary motions at output shaft 65.

Thus through the aforenoted arrangement novel means have been provided for selection of the amount of nonlinearity desired and a unit operative in a large variety of eccentric ranges. The device is compactly packaged and may be used as a component in a gear system and through which device an externally programmed oscillatory motion may be introduced into the device to obtain unique nonlinear rotary motions at the output shaft. The unit may be used as a compensator for the inherent non-linear qualities of a geared instrument.

Although only two embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A coupling mechanism comprising an input shaft, an output shaft, a first eccentric bushing affixed to said input shaft and having a first axially variable cam surface, a second eccentric bushing affixed to said output shaft and having a second axially variable cam surface, an input gear keyed to the first eccentric bushing and axially adjustable on said first axially variable cam surface to adjust the eccentricity of said input gear, an output gear keyed to the second eccentric bushing and axially adjustable on said second axially variable cam surface to adjust the eccentricity of said output gear, means for maintaining said input and output gears in a continuous driving relation during the axial adjustment thereof on said first and second cam surfaces, and operator-operative means for axially adjusting the input and output gears on said first and second cam surfaces to effectively vary the driving ratio between the input and output gears.

2. A coupling mechanism comprising an input shaft, an output shaft, a first eccentric bushing affixed to said input shaft and having a first axially variable cam surface, a second eccentric bushing affixed to said output shaft and having a second axially variable cam surface, an input gear keyed to the first eccentric bushing and axially adjustable on said first axially variable cam surface to adjust the eccentricity of said input gear, an output gear keyed to the second eccentric bushing and axially adjustable on said second axially variable cam surface to adjust the eccentricity of said output gear, means for maintaining said input and output gears in a continuous driving relation during the axial adjustment thereof on said first and second cam surfaces, means for axially adjusting the input and output gears on said first and second cam surface to effectively vary the driving relation between the input and output gears in accordance with a predetermined program.

3. A coupling mechanism comprising an input shaft, an output shaft, a first eccentric bushing affixed to said input shaft and having a first axially variable cam surface, a second eccentric bushing affixed to said output shaft and having a second axially variable cam surface, an input gear keyed to the first eccentric bushing and axially adjustable on said first axially variable cam surface to adjust the eccentricity of said input gear, an output gear keyed to the second eccentric bushing and axially adjustable on said second axially variable cam surface to adjust the eccentricity of said output gear, means for maintaining said input and output gears in a continuous driving relation during the axial adjustment thereof on said first and second cam surfaces, spring means acting at one side of said input and output gears, axially adjustable gear members bearing on the opposite side of said input and output gears, an angularly adjustable pinion operatively engaging said adjustable gear members for axially adjusting therethrough the input and output gears on said first and second cam surfaces to effectively vary the eccentricity of said input and output gears and thereby the driving ratio between the input and output gears.

4. A coupling mechanism comprising an input shaft, an output shaft, a first eccentric bushing affixed to said input shaft and having a first axially variable cam surface, a second eccentric bushing affixed to said output shaft and having a second axially variable cam surface, an input gear keyed to the first eccentric bushing and axially adjustable on said first axially variable cam surface to adjust the eccentricity of said input gear, an output gear keyed to the second eccentric bushing and axially adjustable on said second axially variable cam surface to adjust the eccentricity of said output gear, means including a split gear member mounted on one of said gears and spring means for biasing said split gear member relative to said one gear so as to maintain said one gear in continuous driving relation with the other of said gears during the axial adjustment of said gears on said first and second cam surfaces, and means for axially adjusting the input and output gears on said first and second cam surfaces to effectively vary the driving ratio between the input and output gears.

5. A coupling mechanism comprising an input shaft, an output shaft, a first eccentric bushing affixed to said input shaft and having a first axially variable cam surface, a second eccentric bushing affixed to said output shaft and having a second axially variable cam surface, an input gear keyed to the first eccentric bushing and axially adjustable on said first axially variable cam surface to adjust the eccentricity of said input gear, an output gear keyed to the second eccentric bushing and axially adjustable on said second axially variable cam surface to adjust the eccentricity of said output gear, means to maintain said input and output gears in continuous driving relation during the axial adjustment thereof on said first and second cam surfaces, said means including a split gear member mounted on one of said gears and spring means for biasing said split gear member relative to said one gear, and means for axially adjusting the input and output gears on said first and second cam surfaces to effectively vary the driving relation between the input and output gears in accordance with a predetermined program.

6. A coupling mechanism comprising an input shaft, an output shaft, a first eccentric bushing affixed to said input shaft and having a first axially variable cam surface, a second eccentric bushing affixed to said output shaft and having a second axially variable cam surface, an input gear keyed to the first eccentric bushing and axially adjustable on said first axially variable cam surface to adjust the eccentricity of said input gear, an output gear keyed to the second eccentric bushing and axially adjustable on said second axially variable cam surface to adjust the eccentricity of said output gear, a split gear member mounted on one of said gears and spring means for biasing said split gear member relative to said one gear in such a manner as to maintain said one gear in continuous operative relation with the other of said gears during the axial adjustment of said gears on said first and second cam surfaces, spring means acting at one side of said input and output gears, axially adjustable gear members bearing on the opposite side of said input and output gears, an angularly adjustable pinion operatively engaging said adjustable gear members for axially adjusting therethrough the input and output gears on said first and second cam surfaces to effectively vary the eccentricity of said input and output gears and thereby the driving ratio between the input and output gears.

7. The combination defined by claim 6 including operator-operative means for releasably locking the adjustable gear members in an adjusted position.

8. A coupling mechanism comprising an input shaft, an output shaft, a first eccentric bushing affixed to said input shaft and having a first axially variable cam surface, a second eccentric bushing affixed to said output shaft and having a second axially variable cam surface, an input gear keyed to the first eccentric bushing and axially adjustable on said first axially variable cam surface to adjust the eccentricity of said input gear, an output gear keyed to the second eccentric bushing and axially adjustable on said second axially variable cam surface to adjust the eccentricity of said output gear, a split gear member mounted on one of said gears and spring means for biasing said split gear member relative to said one gear so as to maintain said input and output gears in continuous driving relation during the axial adjustment of said input and output gears on said first and second cam surfaces, spring means acting at one side of said input and output gears, axially adjustable gear members bearing on the opposite side of said input and output gears, an angularly adjustable pinion operatively engaging said adjustable gear members for axially adjusting therethrough the input and output gears on said first and second cam surfaces to effectively vary the eccentricity of said input and output gears, and other cam means for positioning said angularly adjustable pinion and thereby the driving ratio between the input and output gears in accordance with a predetermined operating program.

No references cited.